United States Patent
Ohtomo et al.

(10) Patent No.: US 7,307,699 B2
(45) Date of Patent: Dec. 11, 2007

(54) LIGHT WAVE DISTANCE MEASURING METHOD AND LIGHT WAVE DISTANCE MEASURING SYSTEM

(75) Inventors: Fumio Ohtomo, Itabashi-ku (JP); Kaoru Kumagai, Itabashi-ku (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 148 days.

(21) Appl. No.: 11/137,614

(22) Filed: May 25, 2005

(65) Prior Publication Data

US 2005/0275825 A1 Dec. 15, 2005

(30) Foreign Application Priority Data

Jun. 15, 2004 (JP) .............................. 2004-176798

(51) Int. Cl.
*G01C 3/08* (2006.01)
(52) U.S. Cl. ..................................... 356/4.04
(58) Field of Classification Search ................ 356/4.04
See application file for complete search history.

(56) References Cited

U.S. PATENT DOCUMENTS

| 4,445,029 A * | 4/1984 | Nagaoka et al. ......... 250/201.4 |
| 6,532,060 B1 * | 3/2003 | Kindaichi et al. ......... 356/4.01 |

FOREIGN PATENT DOCUMENTS

| JP | 5-232230 | 9/1993 |
| JP | 7-191144 | 7/1995 |
| JP | 2001-153655 | 6/2001 |

* cited by examiner

*Primary Examiner*—Thomas H. Tarcza
*Assistant Examiner*—Luke D. Ratcliffe
(74) *Attorney, Agent, or Firm*—Nields & Lemack

(57) ABSTRACT

A light wave distance measuring method, using a light wave distance measuring system with a focusing function, comprising a step of comparing a reference distance to an object to be measured obtained based on a position of a focusing lens with a measuring distance obtained by light wave distance measurement, and a step of defining the measuring distance approximately equal to the reference distance as a result of measurement.

6 Claims, 4 Drawing Sheets

LIGHT WAVE DISTANCE MEASURING METHOD AND LIGHT WAVE DISTANCE MEASURING SYSTEM

BACKGROUND OF THE INVENTION

The present invention relates to a non-prism type light wave distance measuring method and a non-prism type light wave distance measuring system.

A distance measuring system using a light wave is a system for projecting a distance measuring light to an object to be measured and for measuring a distance to the object to be measured from a measuring position by receiving a reflection light reflected by the object to be measured. In general, the light wave distance measuring systems divide into two types. One of the two types is a light wave distance measuring system which requires a reflection prism (corner cube) as the object to be measured. The other is a non-prism type light wave distance measuring system without using the reflection prism. The non-prism type light wave distance measuring system projects a distance measuring light directly to an object such as a building, etc. and measures the distance by a reflection light from the object to be measured. In both types of the system, the schematical arrangement and the principle of distance measurement are approximately the same.

Referring to FIG. 4, description will be given on an essential portion of the distance measuring system.

The distance measuring system comprises an optical unit 1 for projecting and receiving a distance measuring light, a driving circuit 3 for driving a light emitting source 2, a photodetection circuit 4 for converting the received distance measuring light to an electric signal, and a distance calculating circuit 5 for calculating a distance based on a signal from the photodetection circuit 4. The optical unit 1 for projecting and receiving the distance measuring light comprises the light emitting source 2 for emitting a distance measuring light 6, a projecting optical system 8 for projecting the distance measuring light 6 from the light emitting source 2 to an object to be measured 7 such as a building, etc., a photodetection optical system 9 for guiding a reflected distance measuring light 6' from the object to be measured 7, a photodetection unit 10 for receiving the reflected distance measuring light 6' guided by the photodetection optical system 9, and a timing circuit 11 for sending a clock signal to the distance calculating circuit 5.

An optical path changeover chopper (not shown) is provided at the middle of an optical path of the distance measuring light 6 and an optical path of a reference light 18 (to be described later) so that the optical pathes are selectively intercepted.

Under the condition that the optical path of the reference light 18 is intercepted by the optical path changeover chopper, the distance measuring light (pulsed laser light or modulated laser light) 6 emitted from the light emitting source (e.g. a semiconductor laser) 2 is deflected by a reflection mirror 14 via a projection side half-mirror 12 and an optical fiber 13 and the distance measuring light 6 is directed toward an objective lens 15 of the projecting optical system 8. After being turned to approximately a parallel luminous flux by the objective lens 15, the distance measuring light 6 is projected toward the object to be measured 7 via the objective lens 15. The reflected distance measuring light 6' reflected by the object to be measured 7 is directed again toward the objective lens 15. Being directed toward the objective lens 15, the reflected distance measuring light 6' is converged by the objective lens 15. The reflected distance measuring light 6' is then deflected by the reflection mirror 14, and passes through an optical fiber 16 and a photodetection side half-mirror 17. An image is formed on the photodetection unit 10, and the reflected distance measuring light 6' is received by the photodetection unit 10.

Furthermore, under the condition that the optical path of the distance measuring light 6 is intercepted by the optical path changeover chopper, the distance measuring light 6 emitted from the light emitting source 2 is split and reflected by the projection side half-mirror 12. The distance measuring light 6 as a reference light 18 is then reflected and deflected by the photodetection side half-mirror 17, and the reference light 18 enters the photodetection unit 10.

At the photodetection unit 10, the reflected distance measuring light 6' or the reference light 18 is received. At an electrical unit (not shown), the reflected distance measuring light 6' and the reference light 18 thus received are converted to electric signals. Based on the electric signals, the distance calculating circuit 5 calculates a distance to the object to be measured 7.

Referring to FIG. 5, description will be given now on operation in case the distance is calculated according to a photodetection signal of the reflected distance measuring light 6' and the photodetection signal of the reference light 18.

Under the condition that the optical path of the reference light 18 is intercepted by the optical path changeover chopper, the light emitting source 2 is driven by the driving circuit 3, and the distance measuring light is emitted as a pulsed light. A pulse signal synchronized with the light emission is inputted to the distance calculating circuit 5 as a light emission pulse P1. Being projected via the objective lens 15, the distance measuring light 6 is reflected by the object to be measured 7 and the distance measuring light 6 is turned to the reflected distance measuring light 6'. The reflected distance measuring light 6' enters the photodetection unit 10 via the photodetection optical system 9. A photodetection signal from the photodetection unit 10 is processed as necessary (e.g. amplification, etc.) at the photodetection circuit 4, and the photodetection circuit 4 produces a photodetection pulse R1 and the photodetection pulse R1 is inputted to the distance calculating circuit 5.

The distance calculating circuit 5 counts clock number between the light emission pulse P1 and the photodetection pulse R1. That is, the distance calculating circuit 5 calculates the time. The clock number is multiplied by light velocity, and approximate distance is calculated. Further, based on phase difference between the light emission pulse P1 and the photodetection pulse R1, a precise measured distance is calculated. By combining the precise measurement with the rough measurement using clock number, a distance to the object to be measured 7 is calculated.

Under the condition that the optical path of the distance measuring light 6 is intercepted by the optical path changeover chopper, the light emitting source 2 is driven by the driving circuit 3, and a pulsed light is emitted. The pulsed light is inputted to the photodetection unit 10 as the reference light 18 via the projection side half-mirror 12 and the photodetection side half-mirror 17.

The distance calculating circuit 5 measures the optical path of the internal reference light based on the light emission pulse P1 and the photodetection pulse R1. The measurement circuit includes an error. The error can be cancelled by subtracting the measurement value in the optical path of the internal reference light from the measurement value of the object to be measured 7 determined by the distance measuring light 6.

From the measurement value of the object to be measured 7, the measurement value of the optical path of the internal reference light determined by the reference light 18 is subtracted. By adding a correction value, a precise measured distance is obtained.

Next, as the situations to perform the distance measurement, there are the following cases, for example,: a case where the distance to the object to be measured is measured via a glass, or a case where there is a metal net between the distance measuring system and the object to be measured, etc. In this case, there is a reflection light from an object not to be measured such as the glass, the metal net, etc. Thus, the photodetection unit 10 outputs the photodetection pulse R1 based on the reflected distance measuring light 6' and also outputs the photodetection pulse R2 based on the reflection light from the object not to be measured as shown in FIG. 6. In this respect, when the distance calculating circuit 5 counts the clock number, it is not possible to judge which of the clock number of the photodetection pulse R1 or the clock number of the photodetection pulse R2 should be counted. If the clock number of the photodetection pulse R2 is counted, it is erroneous measurement. Or two measurement values are generated, and this causes erroneous operation.

The light wave distance measuring instrument is disclosed, in JP-A-5-232230 and JP-A-2001-153655.

SUMMARY OF THE INVENTION

It is an object of the present invention to provide a light wave distance measuring system, by which it is possible to reliably measure a distance to an object to be measured even in case where there is, in the middle of the way or in background of the measurement, an object not to be measured such as a glass, a metal net, etc., which is likely to exert influence on the measurement.

To attain the above object, the present invention provides a light wave distance measuring method, using a light wave distance measuring system with a focusing function, comprising a step of comparing a reference distance to an object to be measured obtained based on a position of a focusing lens with a measuring distance obtained by light wave distance measurement, and a step of defining the measuring distance approximately equal to the reference distance as a result of measurement. Also, the present invention provides the light wave distance measuring method, using a light wave distance measuring system with a focusing function, comprising a step of obtaining a reference distance based on a position of a focusing lens focused on an object to be measured, and a step of performing measurement within a set up range based on the reference distance.

Further, the present invention provides a light wave distance measuring system, with a focusing function, comprising a focusing position detecting unit for detecting a position of a focusing lens, a light wave distance measuring unit, a storage unit for storing a comparing relation obtained in advance between the positions of the focusing lens and distances to the object to be measured, a control arithmetic operation unit for obtaining the reference distance based on the position of the focusing lens and the comparing relation, for comparing the measured distance obtained at the light wave measuring unit with the reference distance and for judging a measuring distance in case the measured distance is approximately equal to the reference distance. Also, the present invention provides the light wave distance measuring system as described above, further comprising an image light receiving unit where an image of the object to be measured is formed, and a focusing driving mechanism for obtaining contrast based on a photodetection signal from the image light receiving unit and for adjusting the position of the focusing lens so that the contrast is at the highest, wherein the reference distance is obtained based on the position of the focusing lens when the contrast is at the highest. Further, the present invention provides the light wave distance measuring system as described above, wherein an alarm is displayed or an alarm is issued in case there is a difference between the reference distance and a result of measurement obtained by the light wave distance measurement.

Also, the present invention provides a light wave distance measuring system with a focusing function, comprising a focusing position detecting unit for detecting a position of a focusing lens, a storage unit for storing a comparing relation obtained in advance between the positions of the focusing lens and distances to the object to be measured and a measurement range determined according to a distance to the object to be measured, and a control arithmetic operation unit for obtaining a reference distance based on the position of the focusing lens and the comparing relation and for performing measurement within the range according to the reference distance.

According to the present invention, in a light wave distance measuring system using a light wave distance measuring system with a focusing function, the method comprises a step of comparing a reference distance to an object to be measured obtained based on a position of a focusing lens with a measuring distance obtained by light wave distance measurement, and a step of defining the measuring distance approximately equal to the reference distance as a result of measurement. As a result, erroneous operation and erroneous measurement can be prevented in case a reflected light from the object not to be measured enters, and this contributes to the improvement of working efficiency and reliability of the measuring operation. Also, by limiting the measurement range, it is possible to selectively measure the object to be measured.

Also, according to the present invention, a light wave distance measuring system with a focusing function comprises a focusing position detecting unit for detecting a position of a focusing lens, a light wave distance measuring unit, a storage unit for storing a comparing relation obtained in advance between positions of a focusing lens and distances to an object to be measured, a control arithmetic operation unit for obtaining a reference distance based on the position of the focusing lens and the comparing relation, for comparing the measured distance obtained at the light wave measuring unit with the reference distance and for judging a measuring distance in case the measured distance is approximately equal to the reference distance by comparing the measured distance obtained at the light wave measuring unit. As a result, erroneous operation and erroneous measurement can be prevented in case a reflected light from an object not to be measured enters, and this contributes to the improvement of working efficiency and reliability of the measuring operation.

DETAILED DESCRIPTION OF THE PREFERRED EMBODIMENT

Figure 1:
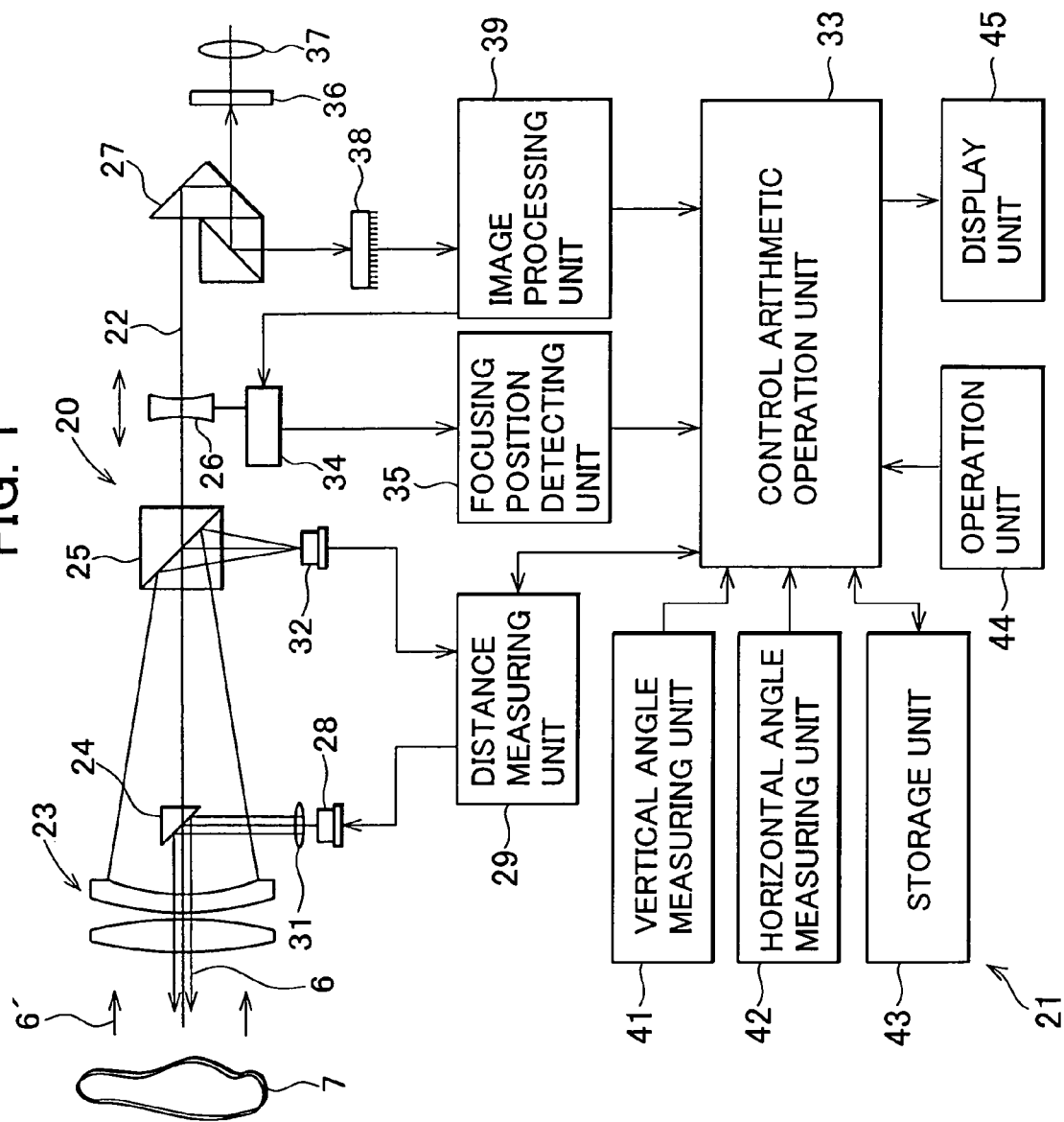
FIG. 1 is a schematical block diagram of an embodiment of the present invention.

Description will be given below on the best mode of the invention for carrying out the present invention by referring to the drawings.

FIG. 1 shows general features of a light wave distance measuring system according to the present embodiment. In the figure, reference numeral 20 denotes an optical system, and reference numeral 21 denotes a control system.

First, description will be given on the optical system 20.

On an optical axis 22, there are provided an objective lens 23, a reflection mirror 24, a dichroic mirror 25, a focusing lens 26, and an erect image prism 27.

A light emitting unit 28 is arranged on a reflection light optical axis of the reflection mirror 24. The light emitting unit 28 is driven by a distance measuring unit 29 and a light is emitted. A distance measuring light 6, preferably, for instance, an infrared light with a wavelength different from the wavelength of natural light, is emitted. The distance measuring light 6 is turned to a parallel luminous flux by a collimator lens 31 and enters the reflection mirror 24. The distance measuring light 6 reflected by the reflection mirror 24 is deflected in a direction of the optical axis 22 and is projected toward an object to be measured 7 via the objective lens 23.

The dichroic mirror 25 is an optical member, which reflects a reflected distance measuring light 6' and allows the natural light to pass. A distance measuring light receiving unit 32 is arranged on a reflection light optical axis of the dichroic mirror 25. Being reflected by the object to be measured 7 and converged by the objective lens 23, the reflected distance measuring light 6' is reflected by the dichroic mirror 25 and is received by the distance measuring light receiving unit 32. The distance measuring light receiving unit 32 sends a photodetection signal to the distance measuring unit 29.

Figure 4:
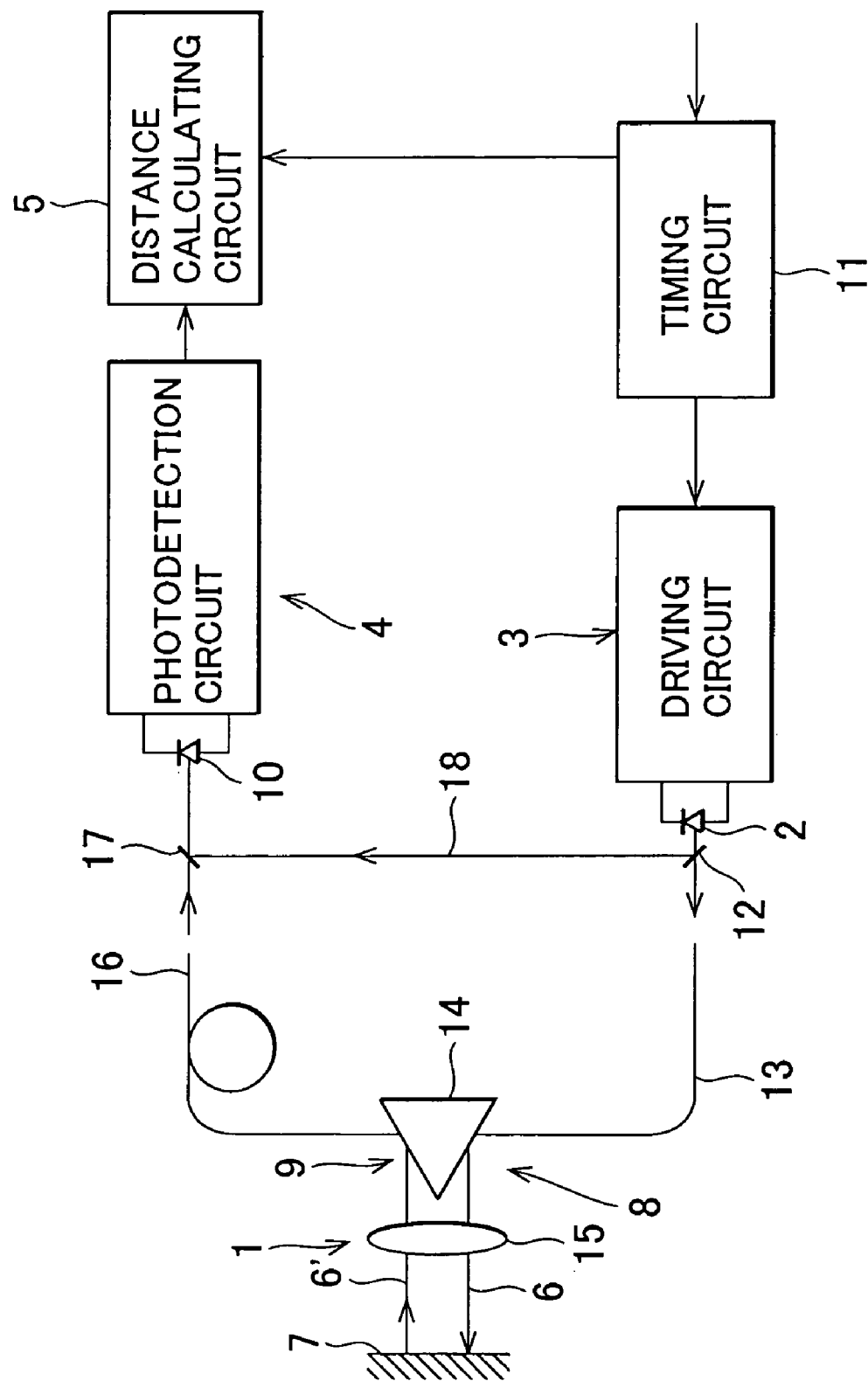
FIG. 4 is a schematical block diagram showing an essential portion of a conventional type distance measuring system.
Figure 5:
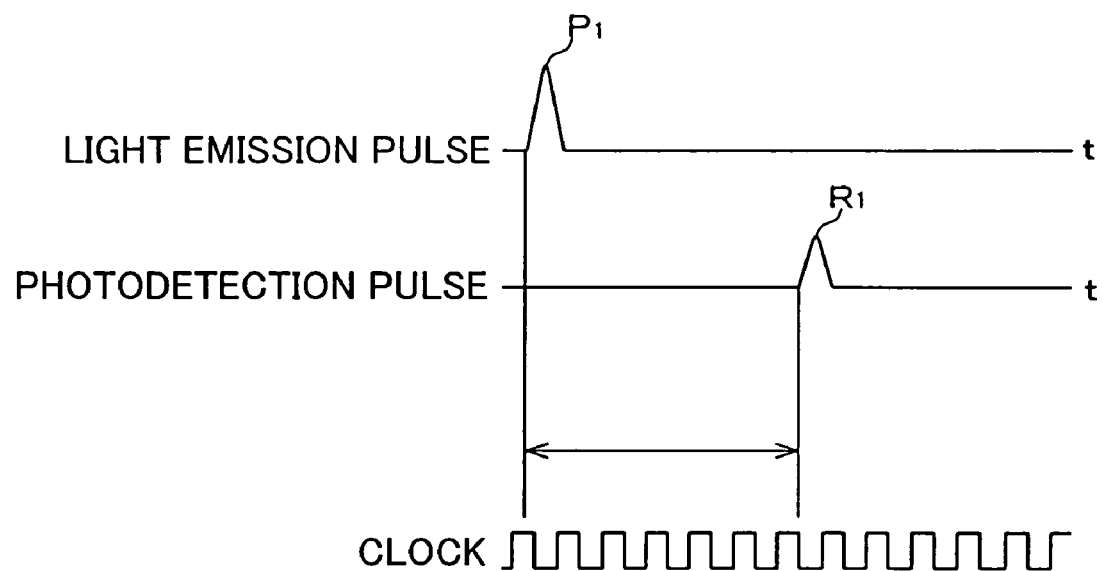
FIG. 5 is a drawing to explain how signals are generated in the conventional type system.
Figure 6:
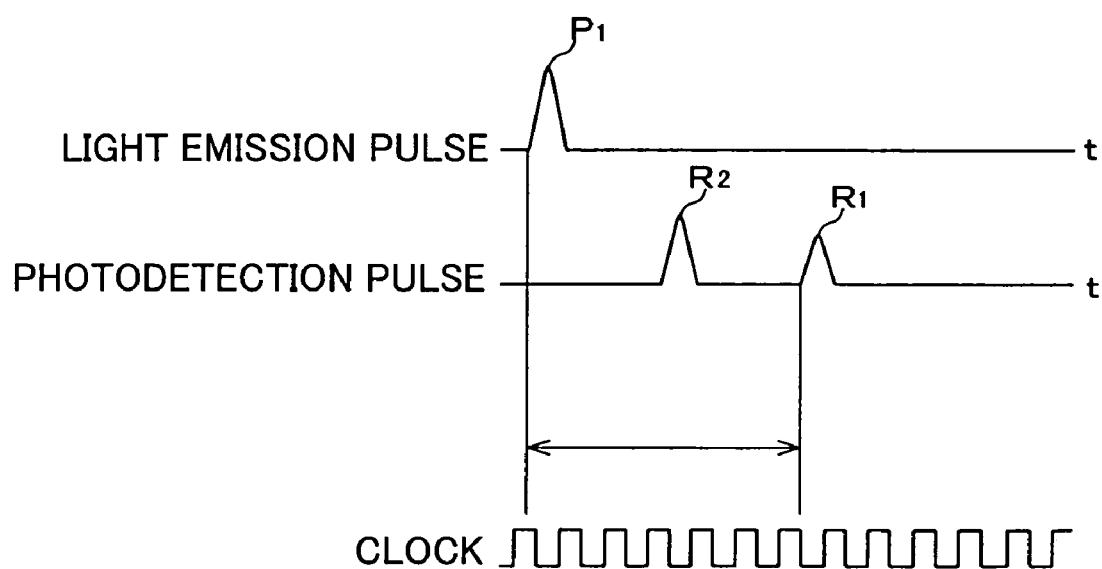
FIG. 6 is a drawing to explain how signals are generated in case an object not to be measured is present in the measurement by the conventional type system.

The distance measuring unit 29 measures a distance up to the object to be measured 7 based on a photodetection result of the reflected distance measuring light 6' by the distance measuring light receiving unit 32 and based on a photodetection result of an internal reference light (not shown), and the distance measuring unit 29 sends a measurement result to a control arithmetic operation unit 33. The arrangement of the distance measuring unit 29 is the same as shown in FIG. 4.

The erect image prism 27 has a plurality of reflection surfaces and projects an incident inverted image as an erect image. At least one of the reflection surfaces is designed as a half-mirror. The natural light from the object to be measured 7 passes through the dichroic mirror 25 and enters the erect image prism 27. The erect image prism 27 projects an image of the object to be measured 7 as an erect image. Also, a part of the incident light is split and separated, and the part of the incident light is projected.

A position of the focusing lens 26 is adjusted along the optical axis 22 by a focusing driving mechanism 34 which comprises a focusing motor (not shown). The position of the focusing lens 26 is detected by a focusing position detecting unit 35 such as a linear encoder, or a rotary encoder for detecting the number of rotations of the focusing motor, etc.

The position of the focusing lens 26 is adjusted. After passing through the erect image prism 27, an erect image is formed on a recticle 36. The image on the recticle 36 is visually confirmed by a measuring operator via an eyepiece 37. Also, the part of the incident light split by the erect image prism 27 forms an image on an image light receiving unit 38, which is at a position conjugate with the recticle 36. The image light receiving unit 38 issues a result of photodetection as an image signal to an image processing unit 39.

Next, description will be given on the control system 21.

The control system 21 primarily comprises the distance measuring unit 29, the focusing position detecting unit 35, the image processing unit 39, the control arithmetic operation unit 33, a vertical angle measuring unit 41, a horizontal angle measuring unit 42, a storage unit 43, an operation unit 44, a display unit 45, etc.

A comparing relation between the position of the focusing lens 26 and a distance to the object to be measured 7 when an image of the object to be measured 7 is formed on the image light receiving unit 38 is obtained in advance by experiment, actual measurement, etc., and data of the comparing relation is stored in the storage unit 43. The data of the comparing relation and the data of measurement range corresponding to a reference distance obtained based on the comparing relation may be stored in advance in the storage unit 43, or it may be written in a storage means such as a memory card, etc., and the storage means may be loaded on the light wave distance measuring system.

In the storage unit 43, there are stored a sequence program for operating the light wave distance measuring system, an image processing program for performing image processing, etc.

Next, description will be given on operation.

Before the distance measuring operation is started, focusing is performed with respect to the object to be measured 7. Focusing may be executed manually or automatically. In the following, description will be given on a case where focusing is performed automatically.

First, the object to be measured 7 is collimated by the measuring operator via the optical system 20, and a collimating direction of the optical system 20 is determined. Starting of the measurement is instructed from the operation unit 44.

An image of the object to be measured 7 by natural light is formed on the image light receiving unit 38.

The focusing driving mechanism 34 is driven, and focusing is performed. An image signal from the image light receiving unit 38 is inputted to the image processing unit 39, and the image processing unit 39 calculates contrast of the image. During scanning the focusing lens 26, the images are sampled. The contrasts of the images are comparatively calculated, and it is judged whether the contrasts are high or low. A position where the contrast is at the highest is a focusing position. The position of the focusing lens 26 at the focusing position is read by the focusing position detecting unit 35 and is stored. The focusing driving mechanism 34 moves the focusing lens 26 to the position where the contrast is at the highest.

Focusing operation based on the contrast is described in JP-A-2001-153655.

The focusing position of the focusing lens 26 is inputted to the control arithmetic operation unit 33 from the focusing position detecting unit 35. At the control arithmetic operation unit 33, a reference distance D0 to the object to be measured 7 is calculated from the comparing relation between the position of the focusing lens 26 and the distance to the object to be measured 7 which is stored in the storage unit 43.

Figure 2:
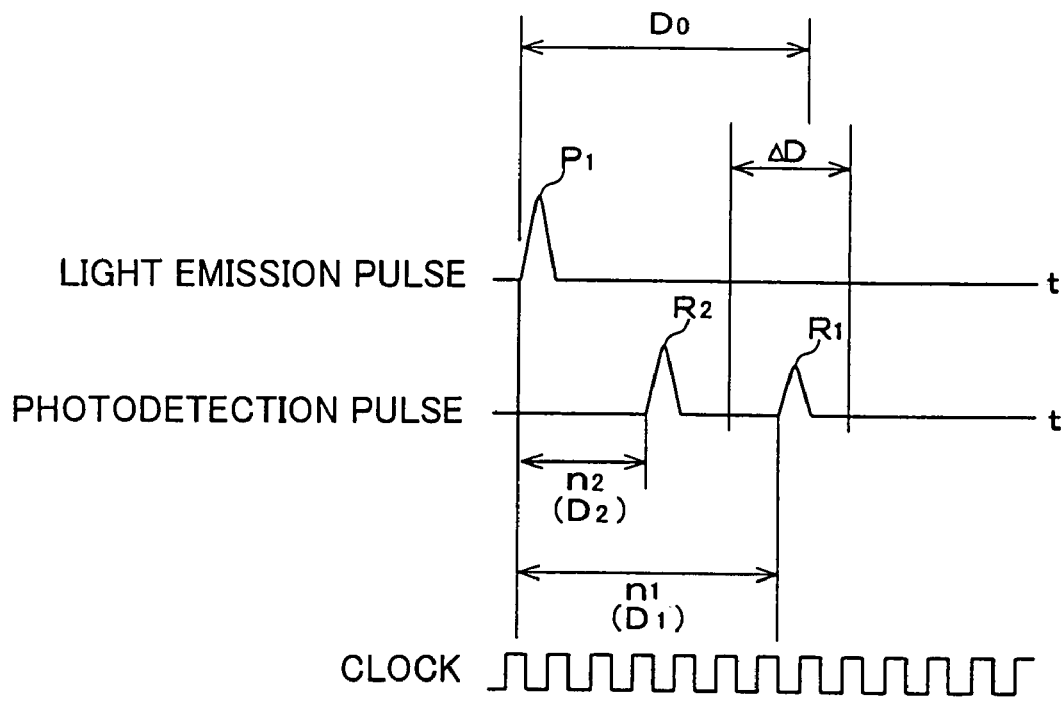
FIG. 2 is a drawing to explain operation in the embodiment of the present invention.

As shown in FIG. 2, the accuracy to measure the distance obtained based on the focusing position of the focusing lens 26 is not high. For instance, an error ΔD of several meters is involved when a measuring distance is 100 meters.

The light emitting unit 28 is turned on and the distance measuring light 6 is emitted. The reflected distance measuring light 6' reflected by the object to be measured 7 is reflected by the dichroic mirror 25 and is received by the distance measuring light receiving unit 32. Based on the photodetection signal when the light is received at the distance measuring light receiving unit 32, a photodetection pulse R1 is generated. A clock number n1 from a light emission pulse P1 of the light emitting unit 28 to the photodetection pulse R1 is counted. Based on the clock number n1, rough measurement to the object to be measured 7 is performed by the distance measuring unit 29, and a rough measured distance D1 is obtained. The rough measured distance D1 is inputted to the control arithmetic operation unit 33.

When an object not to be measured such as a glass, a net, etc. is present between the object to be measured 7 and the light wave distance measuring system, a reflection light from the object not to be measured is also received by the distance measuring light receiving unit 32, and a photodetection pulse R2 is generated. The distance measuring unit 29 calculates a distance D2 to the object not to be measured based on a clock number n2 from the light emission pulse P1 to the photodetection pulse R2.

At the control arithmetic operation unit 33, the reference distance D0 is compared with the rough measured distance D1 and the distance D2, and the rough measured distance D1, which is approximately consistent with the reference distance D0, is selected. The reference distance D0 contains an error ΔD. In general, in many cases, the distance to the object to be measured 7 is substantially different from the distance to the object not to be measured. Thus, there is no practical problem even when an error of several meters may be involved.

When the rough measured distance D1, i.e. the photodetection pulse R1, is selected, the phase deviation from the reference light is detected. The precise measurement is performed, and a final distance to the object to be measured 7 is measured. In case there is an error more than the error ΔD between the reference distance D0 and the rough measured distance D1 obtained by light wave distance measurement, an alarm may be displayed on the display unit 45, or an alarm sound may be issued by a buzzer, etc.

Even in case where two or more objects not to be measured are present, it is possible to discriminate them from the object to be measured. This contributes to the elimination of erroneous operation and erroneous measurement.

It may be designed in such manner that, after the precise measurement is performed on the photodetection pulse R1 and the photodetection pulse R2 respectively, the measuring distance to the object to be measured 7 is selected by comparing with the reference distance D0 obtained based on the position of the focusing lens 26.

Based on the detection results from the vertical angle measuring unit 41 and the horizontal angle measuring unit 42, a vertical angle and a horizontal angle with respect to the object to be measured 7 can be measured respectively as in the case of a conventional type light wave distance measuring system.

The same applies to the case where focusing is performed manually. Focusing condition is judged by visual inspection. If the operator judges that focusing has been performed, the operator, for instance, presses a button to indicate the completion of focusing and the position of the focusing lens 26 under this condition is inputted to the control arithmetic operation unit 33.

In this case, there is no need to use the focusing driving mechanism 34, the image light receiving unit 38, and the image processing unit 39. Also, a feedback signal from the image processing unit 39 is not needed.

Further, according to the present invention, it is possible to set a measuring distance to match the focusing distance and to selectively measure the distance to the object to be measured. For example, this is the case where the object is positioned much to this side but has low reflectivity or in case it is wanted to measure an object such as a glass or a metal net, etc.

Description will be given on the measuring method.

Before the distance is measured, focusing is performed automatically or manually. An image by natural light of the object to be measured 7 such as the glass surface or the metal net, etc. is formed on the image light receiving unit 38. From the focusing position detecting unit 35, the focusing position of the focusing lens 26 is inputted to the control arithmetic operation unit 33. Based on the comparing relation between the position of the focusing lens 26 and the distance to the object to be measured 7 which is stored in the storage unit 43, the control arithmetic operation unit 33 calculates a reference distance D0 to the object to be measured 7. The reference distance D0 contains an error of ΔD to the measuring distance as described above. For instance, a value ΔD is set up as a measurement range to match the focusing distance. The measurement range may be set adequately depending on the measuring conditions.

Figure 3:
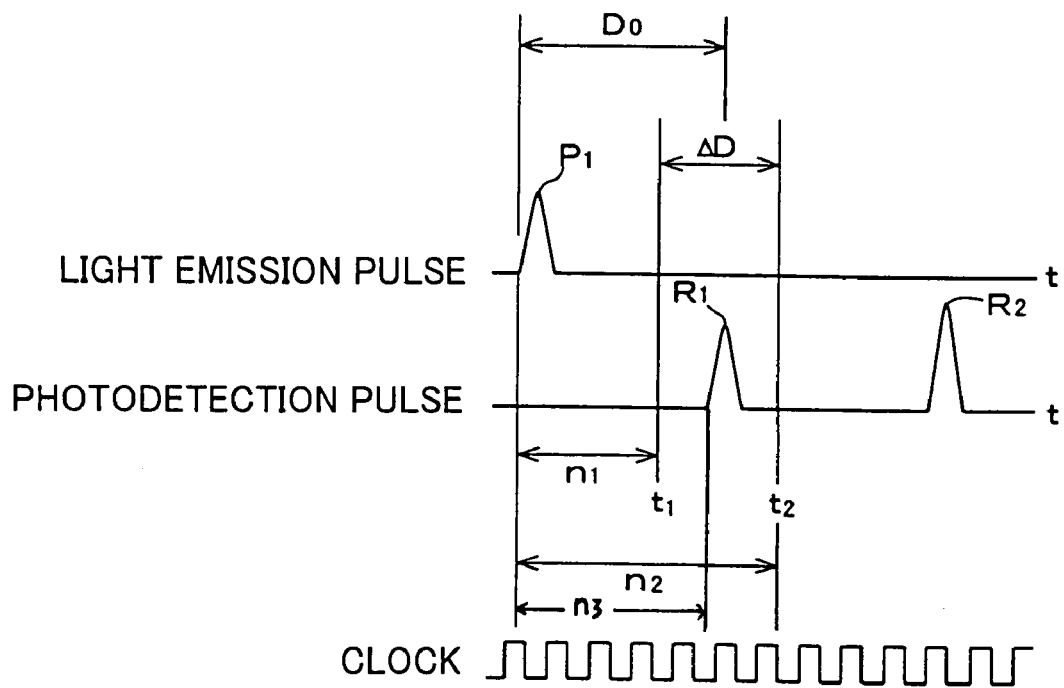
FIG. 3 is a drawing to explain operation in the embodiment of the present invention.

As shown in FIG. 3, time t1, t2 corresponding to the error ΔD are obtained and the number of the clocks up to the pulse R1, which is received between the t1 and the t2, is counted. The count number is n3. Based on the clock number n3, rough measurement to the glass or the metal net is performed by the distance measuring unit 29, and the rough measured distance is obtained. Further, the phase deviation from the reference light is detected in the rough measured distance D1. By precise measurement, a final distance is determined.

What is claimed is:

1. A light wave distance measuring method, using a light wave distance measuring system with a focusing function, comprising a step of measuring a reference distance based on a position of a focusing lens focused on an object to be measured, a step of measuring a light wave measuring distance to the object to be measured by light wave distance measurement, a step of comparing said reference distance with said light wave measuring distance, and a step of selecting the light wave measuring distance that is approximately equal to the reference distance as a result of measurement in case there are two or more light wave measuring distances.

2. A light wave distance measuring method, using a light wave distance measuring system with a focusing function, comprising a step of measuring a reference distance based on a position of a focusing lens focused on an object to be measured, and a step of performing light wave distance measurement within a set up range based on said reference distance.

3. A light wave distance measuring system with a focusing function, comprising a first measuring means, a second measuring means, a storage unit and a control arithmetic unit, wherein said first measuring means is light wave distance measuring unit, said second measuring means obtains a reference distance based on a comparing relation obtained in advance between positions of a focusing lens and distances to an object to be measured, said storage unit stores said comparing relation, and said control arithmetic operation unit obtains the reference distance based on the position of the focusing lens and the comparing relation, compares the measured distance obtained at said light wave measuring unit with the reference distance, and selects a measuring distance in case the measured distance is approximately equal to the reference distance.

4. A light wave distance measuring system according to claim 3, further comprising an image light receiving unit where an image of the object to be measured is formed, and a focusing driving mechanism for obtaining contrast based on a photodetection signal from said image light receiving unit and for adjusting the position of the focusing lens so that the contrast is at the highest, wherein the reference distance is obtained based on the position of said focusing lens when the contrast is at the highest.

5. A light wave distance measuring system according to claim 3, wherein an alarm is displayed or an alarm is issued in case there is a difference between the reference distance and a result of measurement obtained by the light wave distance measurement.

6. A light wave distance measuring system with a focusing function, comprising a first measuring means, a second measuring means, a storage unit and a control arithmetic unit, wherein said first measuring means is a light wave distance measuring unit, said second measuring means obtains a reference distance based on the position of the focusing lens based on a comparing relation obtained in advance between positions of a focusing lens and distances to an object to be measured, said storage unit stores the comparing relation and a measurement range determined according to the distance to the object to be measured, and said control arithmetic operation unit obtains the reference distance based on the comparing relation obtained in advance between the positions of the focusing lens and the distances to the object to be measured and performs light wave distance measurement within the set up range according to the reference distance.

* * * * *